United States Patent [19]

Imura et al.

[11] Patent Number: 5,521,443
[45] Date of Patent: May 28, 1996

[54] BATTERY RESIDUAL CAPACITY DISPLAY AND OPERATING DEVICE FOR AN ELECTRIC VEHICLE

[75] Inventors: Yoshikazu Imura; Kouichi Suyama; Atsuo Ohno; Yoshikazu Takahira, all of Saitama, Japan

[73] Assignee: Honda Giken Kogyo Kabushiki Kaisha, Tokyo, Japan

[21] Appl. No.: 322,023

[22] Filed: Oct. 11, 1994

[30] Foreign Application Priority Data

Oct. 12, 1993 [JP] Japan ..................... 5-254502

[51] Int. Cl.⁶ ..................... B60R 25/00; H02J 7/00
[52] U.S. Cl. ..................... 307/10.2; 307/10.7; 180/287; 320/48; 340/455; 340/825.31; 340/825.76
[58] Field of Search ..................... 307/10.1–10.7; 70/252, 256–258, 278, DIG. 46; 123/198 B, 198 DB, 198 DC; 180/287, 271; 364/483; 320/44, 48; 324/435, 427, 433, 426; 340/636, 426, 425.5, 455, 539, 825.31, 825.32, 825.34, 825.44, 825.45, 825.69, 825.72, 825.76

[56] References Cited

U.S. PATENT DOCUMENTS

| | | | |
|---|---|---|---|
| 3,090,871 | 5/1963 | Gorman | 307/10.1 |
| 3,940,679 | 2/1976 | Brandwein et al. | 320/48 |
| 4,217,645 | 8/1980 | Barry et al. | 364/483 |
| 4,236,594 | 12/1980 | Ramsperger | 307/10.4 |
| 4,250,976 | 2/1981 | Mochida | 307/10.3 |
| 4,671,111 | 6/1987 | Lemelson | 73/432.1 |
| 4,673,921 | 6/1987 | Saito et al. | 180/287 |
| 4,820,966 | 4/1989 | Fridman | 320/32 |
| 4,890,108 | 12/1989 | Drori et al. | 340/825.69 |
| 5,008,647 | 4/1991 | Brunt et al. | 340/432 |
| 5,206,097 | 4/1993 | Burns et al. | 420/90 |
| 5,254,996 | 10/1993 | Claar et al. | 340/636 |
| 5,352,982 | 10/1994 | Nakazawa et al. | 320/48 |

FOREIGN PATENT DOCUMENTS 63-19181  12/1988  Japan.
4-14366   2/1992   Japan.

*Primary Examiner*—William M. Shoop, Jr.
*Assistant Examiner*—Richard T. Elms
*Attorney, Agent, or Firm*—Lyon & Lyon

[57] ABSTRACT

A portable display device is capable of monitoring the residual capacity of a traveling battery from the outside of an electric vehicle, and conducting operations such as locking and unlocking of a door from outside of the vehicle and controlling the operation of the air conditioner through wireless means. This portable display device is inserted into an insertion section provided in an instrument panel of the vehicle for operating the vehicle. If an ID code in the portable display device agrees with an ID code in the vehicle, a traveling switch is unlocked. Then, if the traveling switch is operated, a steering lock device is released and the traveling motor is connected to the traveling battery in a state in which the electric vehicle is operable.

13 Claims, 8 Drawing Sheets

BATTERY RESIDUAL CAPACITY DISPLAY AND OPERATING DEVICE FOR AN ELECTRIC VEHICLE

BACKGROUND OF THE INVENTION

1. Field of the Invention

The present invention relates to a battery residual capacity display and operating device for an electric vehicle for displaying, on a portable display means which is outside the electric vehicle, the residual capacity of a traveling battery mounted in the vehicle and operating certain functions of the vehicle.

2. Description of the Prior Art

A portable battery residual capacity display device for an electric vehicle has already been proposed by the present assignee in Japanese Patent Application No. 14366/92 (which corresponds to pending U.S. application Ser. No. 08/328,558). By that portable battery residual capacity display device, it is possible not only to monitor the residual capacity and charged state of the battery, but also to monitor the operational state of an air conditioner and to signal an alarm if the vehicle is about to be stolen, all from a place remote from the vehicle.

In the above prior art electric vehicle, a traveling key corresponding to an ignition key for a vehicle including an internal combustion engine is required, and there is the disadvantage that an electric vehicle's owner must carry about both the portable display means and the traveling key.

SUMMARY OF THE INVENTION

Accordingly, it is an object of the present invention to overcome the aforesaid disadvantage by providing the portable display means with the function of the traveling key.

To achieve the above object, according to the present invention, there is provided a battery residual capacity display device for an electric vehicle for displaying, on a portable display means separated from the electric vehicle, the residual capacity of a traveling battery mounted in the electric vehicle, the display device comprising: an insertion section provided in the vehicle for insertion of the portable display means; a checking means for checking whether the portable display means inserted into the insertion section is matched to the electric vehicle; and a travel permitting means for permitting the traveling of the electric vehicle on the basis of an output from the checking means.

With the above construction, it is possible to provide the portable display means with a function corresponding to a traveling key and therefore it is extremely convenient because it is unnecessary to carry about the traveling key.

If the portable display means has a vehicle state displaying function having a function to signal an alarm if the vehicle is about to be stolen or a function to display a vehicle air-conditioned state, it is possible to know the state of the vehicle from outside of the vehicle.

If the portable display means has a vehicle control function comprising a vehicle door locking/unlocking function or a vehicle air-conditioner operating/stopping function, it is possible to control those functions of the vehicle from outside of the vehicle.

If the travel permitting means is operated by the operation of a traveling switch following the insertion of the portable display means, it is necessary to operate the traveling switch in the same manner corresponding to the ignition key for a prior art vehicle having an internal combustion engine mounted therein at the start and the stoppage of the electric vehicle and hence, it is possible and normal for even a driver experienced in the operation of the vehicle having the internal combustion engine mounted therein to conduct the operation without an unfamiliar feeling.

The above and other objects, features and advantages of the invention will become apparent from the following description of a preferred embodiment taken in conjunction with the accompanying drawings.

BRIEF DESCRIPTION OF THE DRAWINGS

FIGS. 1 to 6 illustrate a preferred embodiment of the present invention, wherein FIG. 1 is a perspective view illustrating a front surface of a portable display means;

FIG. 2 is a perspective view illustrating a back surface of the portable display means;

FIG. 3 is a block diagram illustrating the circuit arrangement of the portable display means;

FIG. 4 is a block diagram illustrating the circuit arrangement of a control unit mounted in an electric vehicle;

FIG. 5 is a perspective view of on operator's compartment in the vehicle;

FIG. 6 is a diagram illustrating the structure around a traveling switch;

DESCRIPTION OF THE PREFERRED EMBODIMENTS

Figure 1:
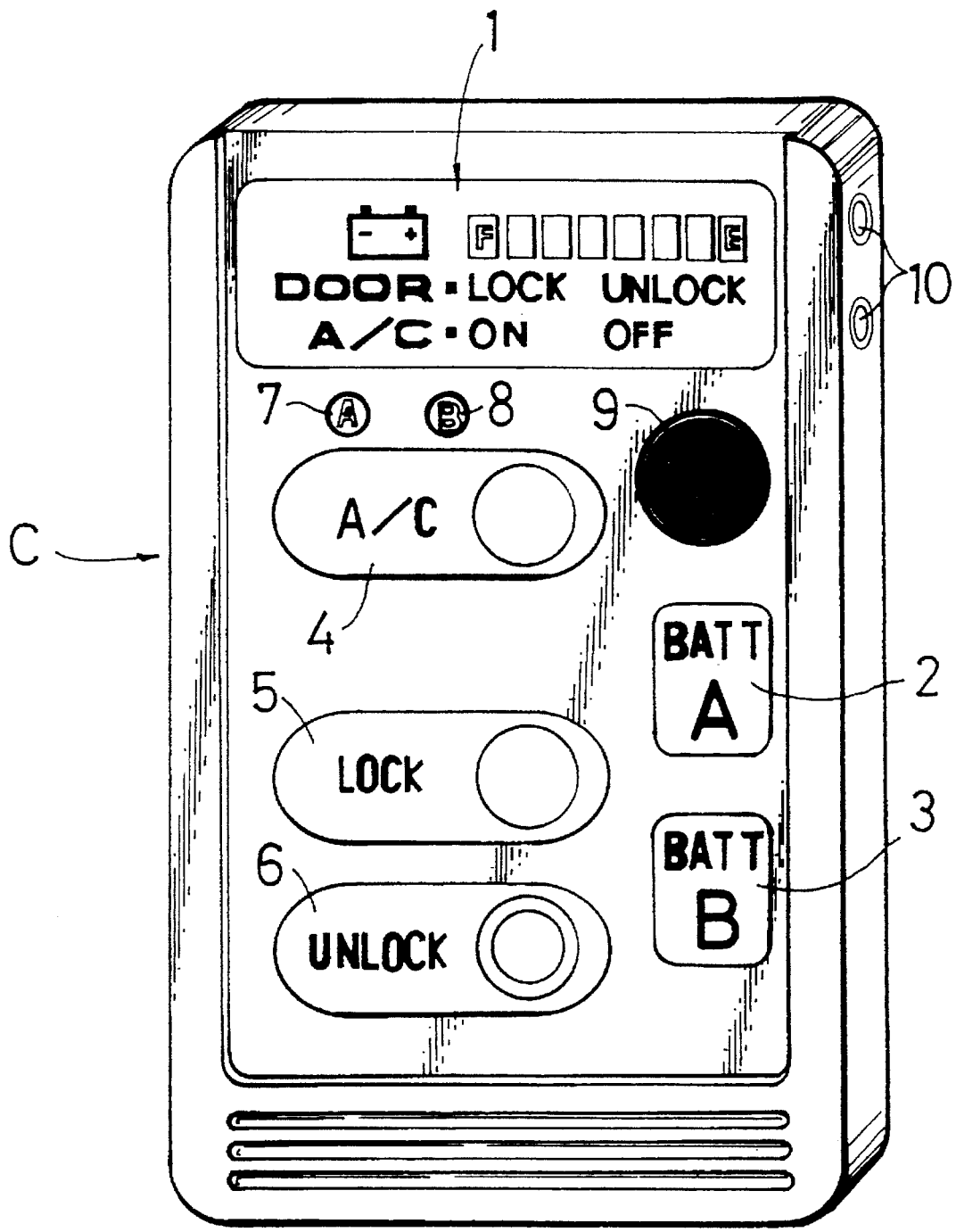

Referring to FIG. 1, a portable display means C carried about by an electric vehicle's owner is formed into a type of card, similar in size (except thickness) to a credit card or bank card, so that it is convenient to carry it about. The portable display means C is provided at an upper portion of its surface with a display area 1 for displaying the residual capacity of a traveling battery or an auxiliary battery mounted in an electric vehicle, the locked state of a door, and the operational state of an air conditioner. The display area 1 includes a plurality of light-emitting diodes. If the battery is in a fully-charged state, all of the eight light-emitting diodes from "E" to "F" are lighted. As the residual capacity of the battery is decreased, the number of light-emitting diodes lighted is decreased. When the battery is completely discharged, only the light-emitting diode "E" is lighted. If the door is in its locked state, the light-emitting diode for displaying "LOCK" is lighted, and if the door is in its unlocked state, the light-emitting diode for displaying "UNLOCK" is lighted. Further, if the air conditioner is in its operating state, the light-emitting diode for displaying "ON" is lighted, and if the air conditioner is in its stopped state, the light-emitting diode for displaying "OFF" is lighted.

Five push-button type switches are provided on the surface of the portable display means C. If the battery monitor switch 2 is pushed, the residual capacity of the traveling battery is displayed on the display area 1. If the battery monitor switch 3 is pushed, the residual capacity of the auxiliary battery is displayed on the display area. Whenever the air conditioner operating switch 4 is pushed, the air conditioner ms switched over between its ON and OFF states. If the locking switch 5 or the unlocking switch 6 is pushed, the door is locked or unlocked, respectively.

Two discharge alarms 7 and 8 each comprising light-emitting diode are provided on the surface of the portable display means C. If the residual capacity of the traveling battery is lower than a predetermined value, the discharge alarm 7 is lighted. If the residual capacity of the auxiliary battery is lower than a predetermined value, the discharge alarm 8 is lighted. Further, an alarm 9 is provided on the surface of the portable display means C. The alarm 9 signals an alarm, if the vehicle is stolen or is about to be stolen. Reference character 10 in FIG. 1 is a communication terminal which is adapted to be connected to a control unit in the vehicle, when the portable display means C is inserted into an insertion section (which will be described hereinafter) provided in an instrument panel.

Figure 2:
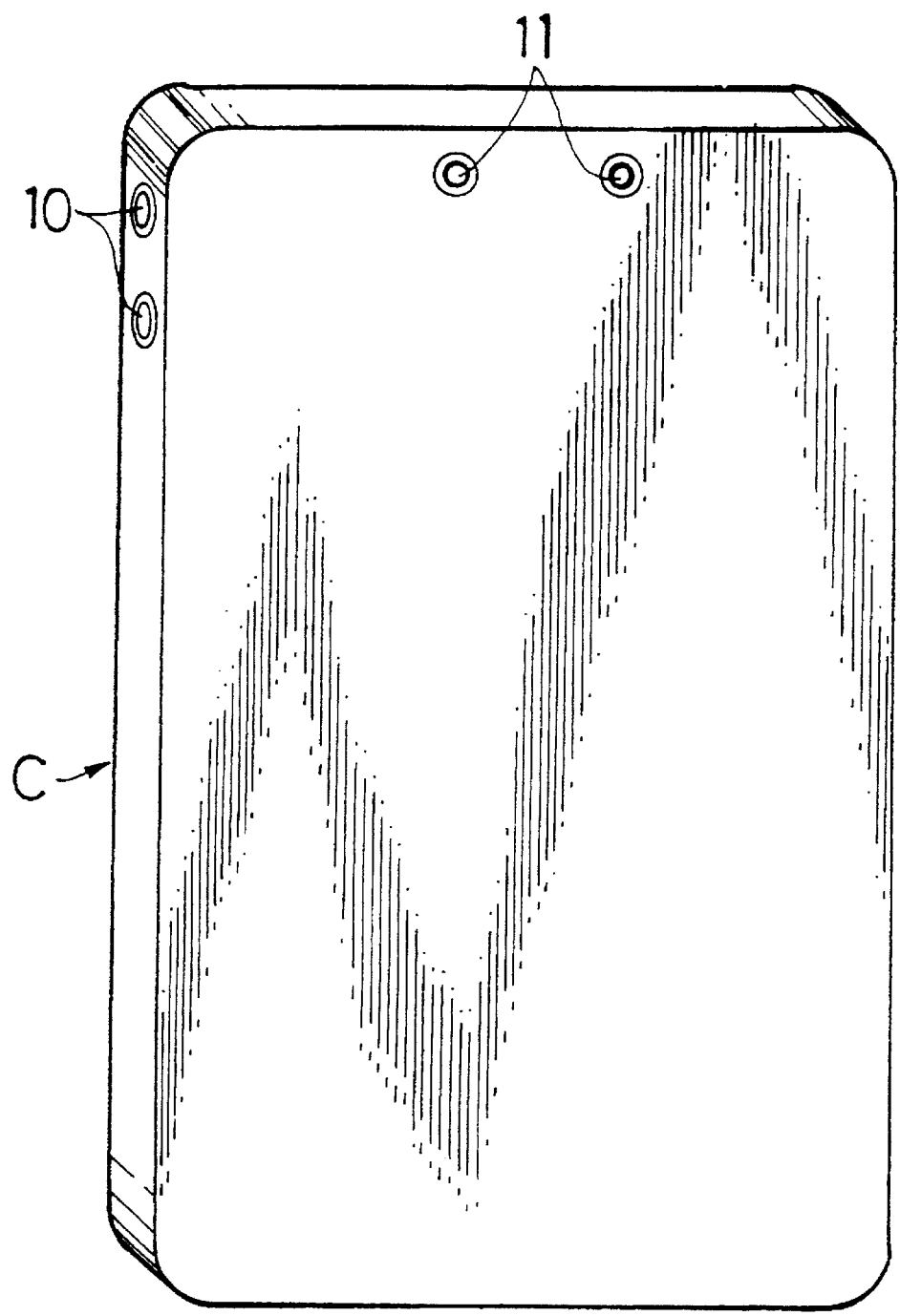

As shown in FIG. 2, a charging terminal 11 is provided on the back of the portable display means C, and is adapted to be connected to the control unit in the vehicle when the portable display means C is inserted into the insertion section.

Figure 3:
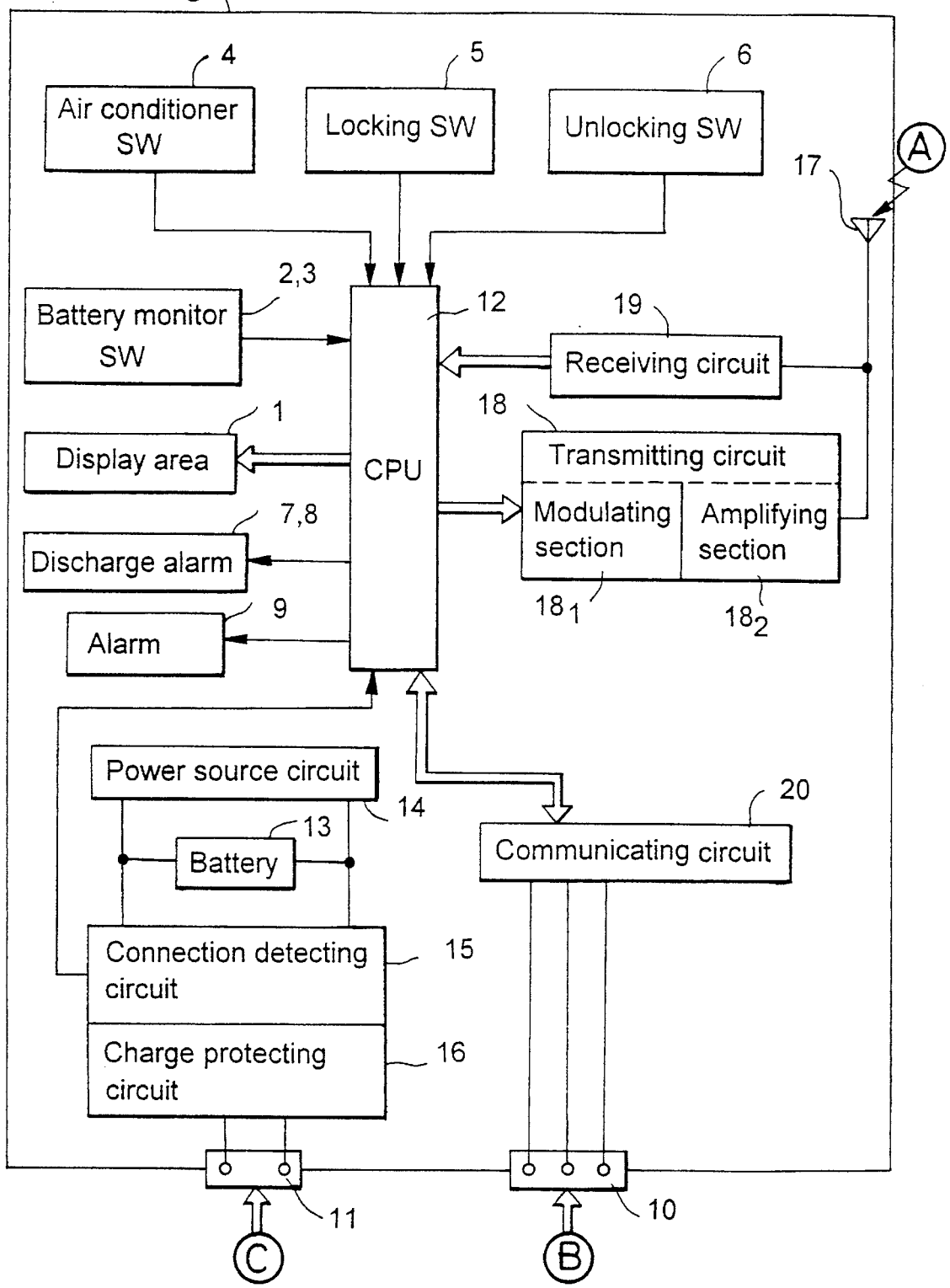

As shown in FIG. 3, the display area 1, the battery monitor switches 2 and 3, the air conditioner operating switch 4, the door locking switch 5, the door unlocking switch 6, the discharge alarms 7 and 8 and the alarm 9 are connected to a central processing unit (CPU) 12 in the portable display means C. A chargeable battery 13 such as an Ni—Cd battery is mounted within the portable display means C. A power source circuit 14, a connection detecting circuit 15 and a charge protecting circuit 16 are connected to the battery 13. The connection detecting circuit 15 is connected to the central processing unit 12, and the charge protecting circuit 16 is connected to the charging terminal 11.

The portable display means C includes an antenna 17 for wireless communication with the control unit in the vehicle. The antenna 17 is connected to the central processing unit 12 through a transmitting circuit 18 having a modulating section $18_1$ and an amplifying section $18_2$ and through a receiving circuit 19. The communicating terminal 10 is connected to the central processing unit 12 through a communication circuit 20.

Figure 4:
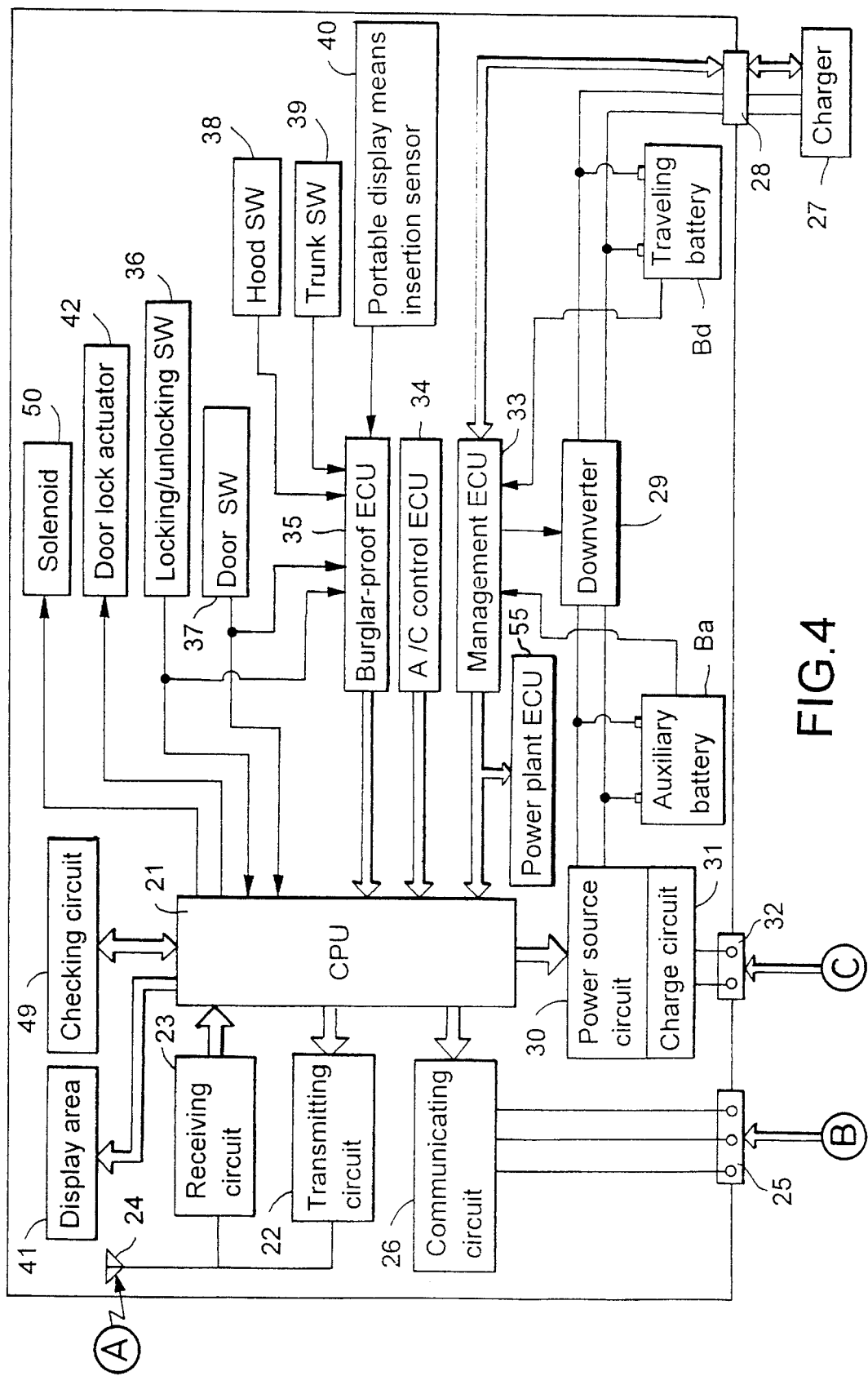

As shown in FIG. 4, a central processing unit (CPU) 21 of the control unit in the electric vehicle is connected to an antenna 24 through a transmitting circuit 22 and a receiving circuit 23 and also to a communicating terminal 25 capable of being coupled to the communicating terminal 10 of the portable display means C through a communicating circuit 26.

A traveling battery Bd and an auxiliary battery Ba are mounted in the electric vehicle. A charger 27 is provided outside the vehicle and connected to the traveling battery Bd through a connector 28. The traveling battery Bd is connected to the auxiliary battery Ba through a downverter 29. The auxiliary battery Ba is connected to the charging terminal 32 capable of being coupled to the charging terminal 11 of the portable display means C, through a power source circuit 30 and a charging circuit 31.

A management electronic control unit (ECU) 33, an air conditioner control ECU 34, a burglar-proof ECU 35 and a power plant ECU 55 for controlling a traveling motor 45 are connected to the central processing unit 21 constituting a travel permitting means of the present invention.

Signals indicative of a residual capacity, a temperature, a concentration of hydrogen, the presence or absence of an electric leakage, a charging current, a charging voltage and the like are supplied from sensors provided on the traveling battery Bd and the auxiliary battery Ba to the management ECU 33. In order to appropriately charge and manage the traveling battery Bd and the auxiliary battery Ba on the basis of these signals, the charger 27, the downverter 29, a breaker (not shown), and a conductor (not shown) and the like are controlled in a conventional manner. The air conditioner control ECU 34 controls the air conditioner on the basis of the passenger compartment temperature detected by a compartment temperature sensor, a temperature set by a temperature setting switch and the like. Signals from a locking/unlocking switch 36 for detecting a locked state of a door, a door switch 37 for detecting an opened or closed state of the door, a hood switch 38 for detecting an opened or closed state of a hood, a trunk switch 39 for detecting an opened or closed state of a trunk and a portable display means insertion sensor 40 for detecting whether the portable display means C has been inserted into the insertion section provided in the passenger compartment are supplied to the burglar-proof ECU 35 to judge whether the vehicle is about to be stolen.

Information such as the residual capacities of the traveling battery Bd and the auxiliary battery Ba detected by the management ECU 33 and information such as the air-conditioned state in the compartment detected by the air conditioner control ECU 34 and the like are displayed on the display area 41 provided on the electric vehicle instrument panel. When the burglar-proof ECU 35 judges that the electric vehicle is in a state to be stolen, a door lock actuator 42 is operated if the door is in its unlocked state, and an alarm signal such as tooting of a horn and lighting of a head light is performed.

Figure 5:
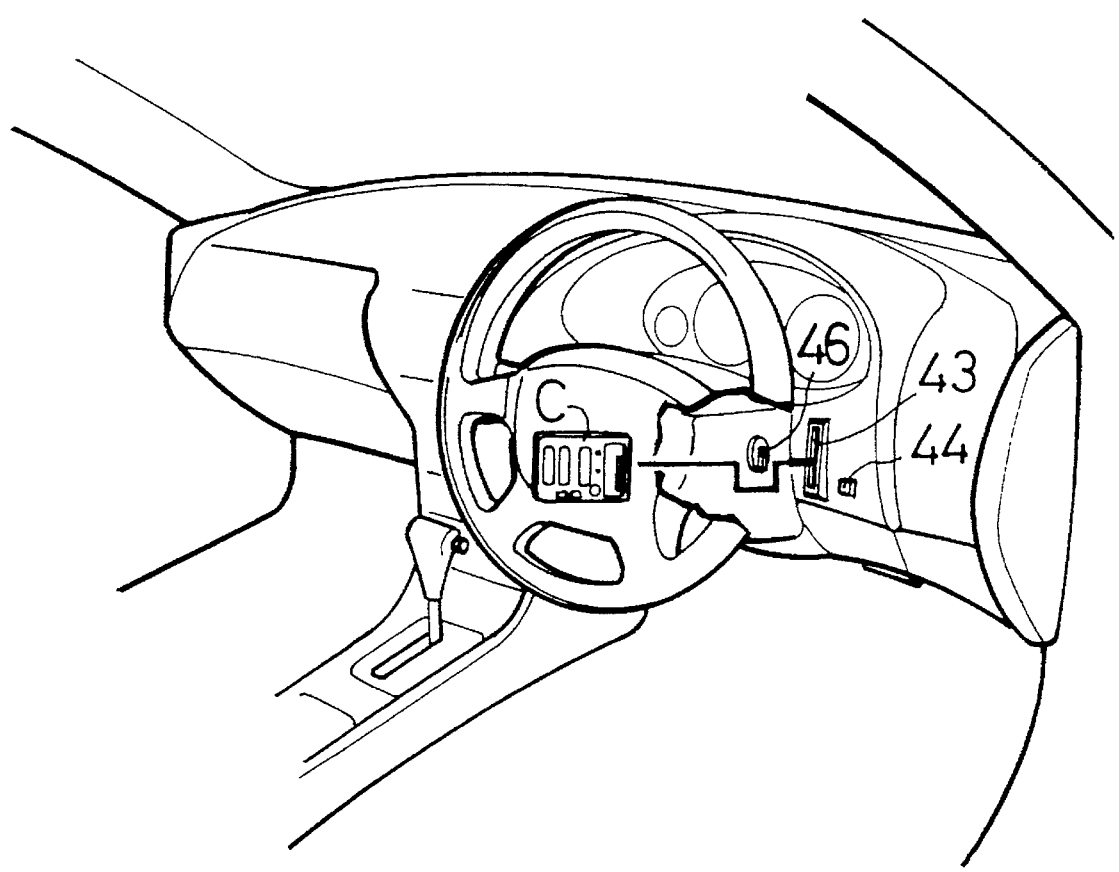
Figure 6:
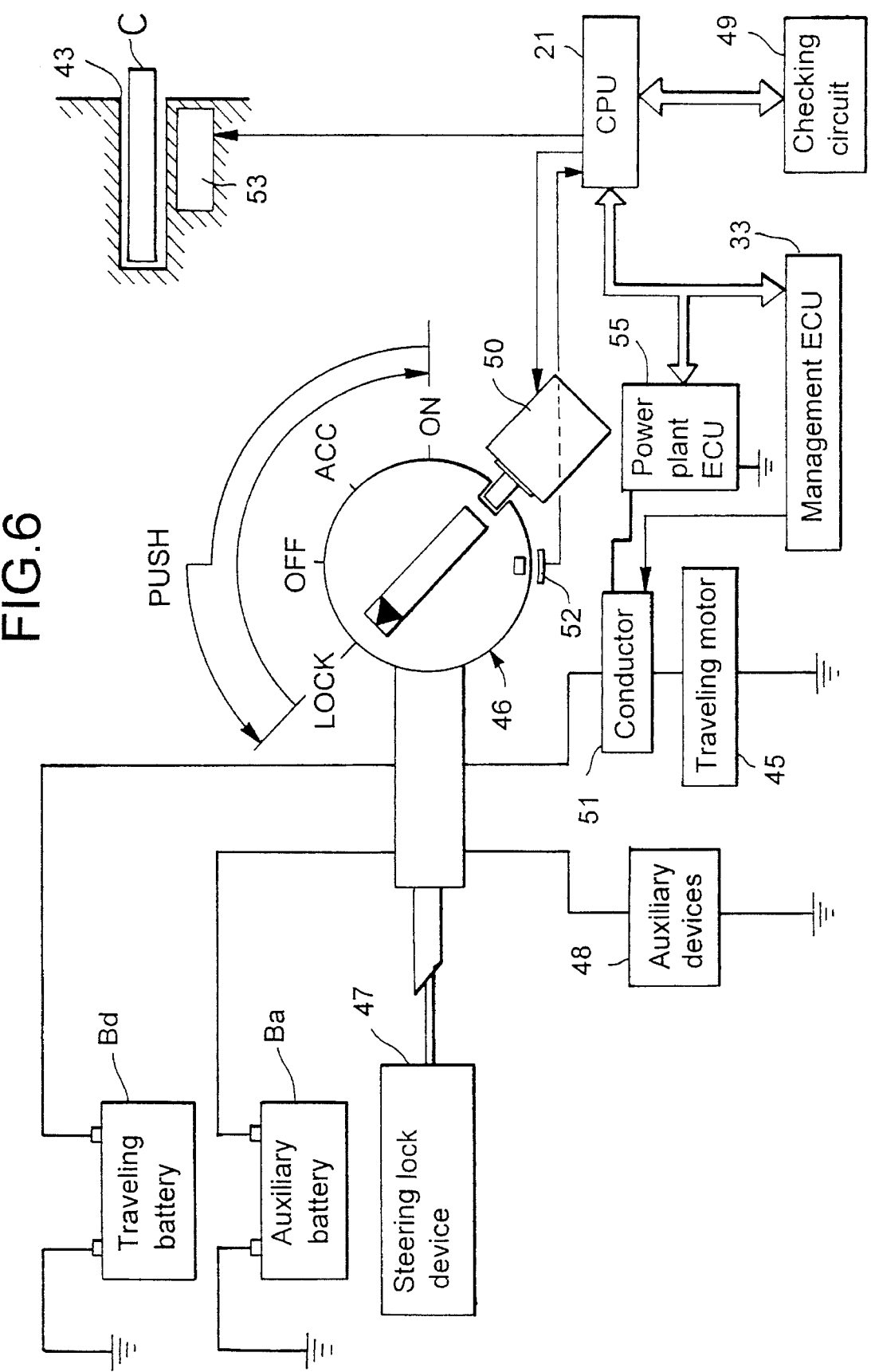

As is apparent from FIGS. 5 and 6 in addition to FIG. 4, the instrument panel in the electric vehicle includes an insertion section 43 into which the portable display means C is inserted, an ejecting button 44 for removing the inserted portable display means C, and a traveling switch 46 for releasing a steering lock device 47 constituting the travel permitting means of the present invention and bringing a traveling motor 45 into a state in which the motor 45 can drive the vehicle. The traveling switch 46 corresponds to an ignition switch in a conventional vehicle including an internal combustion engine mounted therein and is turnable among a "LOCK" position in which the steering lock device 47 is operated, an "OFF" position in which the steering lock device 47 is released, an "ACC" position in which the auxiliary battery Ba is connected to various auxiliary devices 48 and the like, and an "ON" position in which the traveling motor 45 is connected to the traveling battery Bd to bring the electric vehicle into a traveling state.

A checking or identifying circuit 49 and a solenoid 50 are connected to the central processing unit 21. If it is confirmed by the checking circuit 49 that the portable display means C inserted into the insertion section 43 is proper and matched to that particular vehicle, as described more fully below, the central processing unit 21 actuates the solenoid 50 to unlock the traveling switch 46, thereby bringing the power plant ECU 55 into an operable state, while at the same time, operating the conductor 51 through the management ECU and bringing the traveling motor 45 into a state in which the motor 45 can drive the electric vehicle.

The operation of the embodiment of the present invention having the above-described arrangement now will be described.

When the electric vehicle's owner is out of the vehicle, the portable display means C and the control unit in the vehicle are capable of communicating with each other by wireless transmissions, so that the residual capacity of the traveling battery Bd or the auxiliary battery Ba can be displayed on the display area 1 of the portable display means C on the basis of the battery state detected in the management ECU 33 of the control unit in the vehicle by pushing down the battery monitor switch 2 or 3 of the portable display means C. If the residual capacity of the traveling battery Bd or the auxiliary battery Ba has been reduced to a value equal to or lower than a predetermined reference value, then the discharge alarm 7 or 8 is lighted to give an alarm for demanding charging even without pushing the battery monitor switch 2 or 3.

The operation for starting and stopping the air conditioner can be controlled from outside of the vehicle by pushing the air conditioner operating switch 4 of the portable display means C, thereby conducting the appropriate air conditioning within the compartment before the owner gets into the vehicle. Further, the door can be locked or unlocked without the use of a key from outside of the vehicle by pushing down the locking switch 5 or the unlocking switch 6. Yet further, when the owner is in a place apart from the vehicle, if it is detected by the burglar-proof ECU 35 that the door is unlocked or that the hood or trunk is opened and the vehicle may be stolen, the alarm 9 of the portable display means C signals an alarm for the owner.

When a wireless communication is to be conducted between the portable display means C and the control unit in the vehicle, their ID codes are compared with each other. If the ID codes disagree with each other, it is impossible to conduct the communication. Therefore, only the portable display means C that is matched to the electric vehicle can perform the unlocking of the door from outside of the vehicle.

Now, to operate the electric vehicle for traveling, the owner unlocks the door by use of the portable display means C to get into the compartment, and then inserts the portable display means C into the insertion section 43 in the instrument panel. The insertion of the portable display means C causes the communicating terminal 10 and the charging terminal 11 of the portable display means C to be electrically connected to the communicating terminal 25 and the charging terminal 32 of the control unit mounted in the vehicle. When the portable display means C is in a state in which it has been inserted into the insertion section 43, the battery 13 of the portable display means C is charged by the traveling battery Bd and the auxiliary battery Ba mounted in the electric vehicle, thereby preventing a complete discharge of the battery 13 of the portable display means C by charging the battery 13 each time the electric vehicle is operated.

The connection of the communicating terminals 10 and 25 with each other causes the ID code stored in the portable display means C to be compared with the ID code stored in the control unit of the vehicle in the checking circuit 49. If the codes agree with each other, i.e., if the portable display means C being now in the inserted state in the insertion section 43 is proper and matched to the electric vehicle, then the solenoid 50 and the conductor 51 shown in FIG. 6 are operated, and the power plant ECU 55 is brought into its operable state. The operation of the solenoid 50 causes the traveling switch 46 to be unlocked for allowing the traveling switch 46 to be turned clockwise from the "LOCK" position to the other operation positions of "OFF," "ACC" and "ON".

When the traveling switch 46 is turned to the "OFF" position, the steering lock device 47 is released. When the traveling switch 46 is further turned into the "ACC" position, the auxiliary battery Ba is connected to the auxiliary devices 48. When the traveling switch 46 is further turned to the "ON" position, the traveling battery Bd is connected to the traveling motor 45, because the conductor 51 is in operation, as described above. Thus, the traveling motor 45 can be operated to drive the electric vehicle by depressing down on an accelerator pedal (not shown).

In this manner, the portable display means C is provided with the conventional ignition key functions by comparing the ID code in the portable display means C with the ID code in the electric vehicle to ensure that a person other than the owner cannot operate the electric vehicle. Moreover, unless the steering lock device 47 is released by operating the traveling switch 46 after insertion of the portable display means C, the electric vehicle cannot be driven and for this reason, even a person skilled in the operation of a conventional vehicle including an internal combustion engine mounted therein can conduct the starting operation of the electric vehicle without an unfamiliar feeling. In addition, during traveling of the vehicle, the portable display means C is necessarily inserted in the insertion section 43 and hence, there is no possibility to lose the portable display means C.

When the owner stops the vehicle and wishes to leave the electric vehicle, the traveling switch 46 is first returned to the "LOCK" position to operate the steering lock device 47. Then, the ejector button 44 is pushed to conduct the operation of withdrawing the portable display means C from the insertion section 43. In this case, even if the ejector button 44 is pushed without returning the traveling switch to the "LOCK" position, the portable display means C cannot be withdrawn by the operation of an ejector locking mechanism 53 on the basis of an output from a traveling switch position sensor 52 (see FIG. 6).

If the owner opens the door and leaves the vehicle without withdrawing the portable display means C, the alarm 9 signals an alarm by reason of a signal from the portable display means insertion sensor 40 mounted at the insertion section 43. Even when the owner leaves the vehicle after withdrawal of the portable display means C, the alarm 9 signals an alarm, if the owner forgets to push the locking switch 5 of the portable display means C to lock the door.

Although the embodiment of the present invention has been described in detail, it will be understood that the present invention is not limited to the above-described embodiment, and various modifications in design may be made without departing from the spirit and scope of the invention defined in claims.

Figure 7:
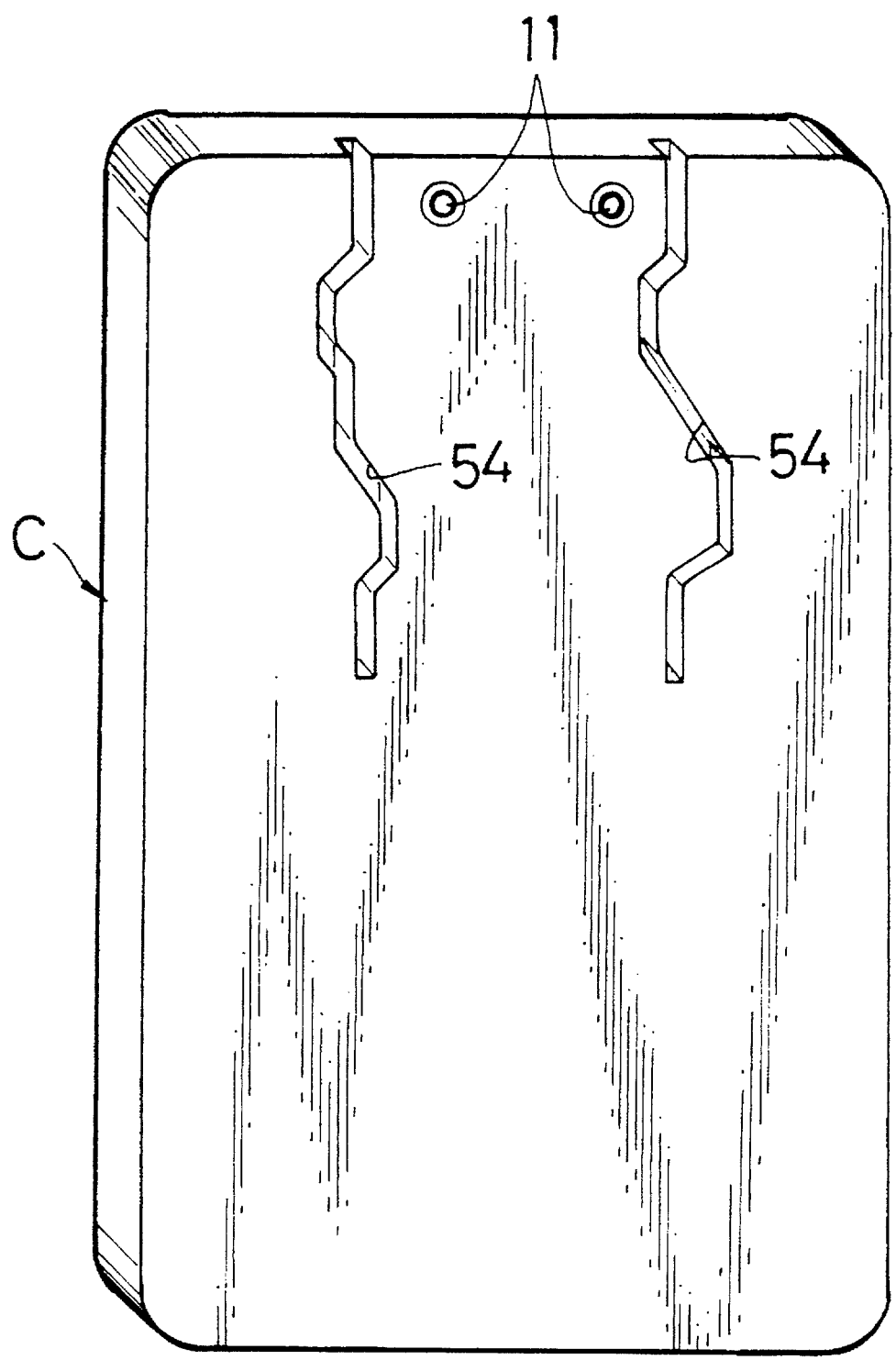
FIG. 7 in a perspective view, similar to FIG. 2, illustrating a back surface of a modified form of the portable display means.
Figure 8:
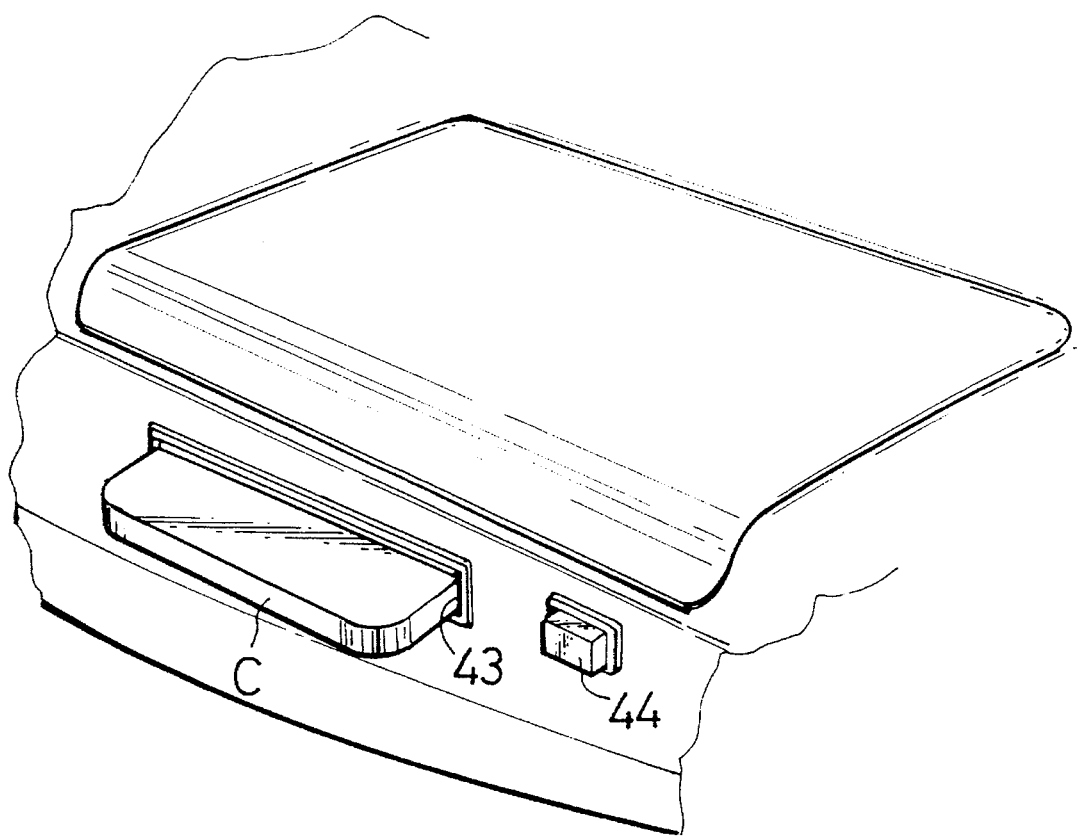
FIG. 8 is a perspective view, similar to FIG. 5, illustrating a portion of the operator's compartment and the portable display means.

For example, when the portable display means C has been inserted into the insertion section 43, the comparison of the ID codes is carried out through the communicating terminals 10 and 25 in the embodiment. Alternatively, ID comparing grooves 54, such as shown in FIG. 7, may be provided in the back surface of the portable display means C, for thereby physically comparing whether the portable display means inserted is a proper match with the vehicle, similar to a key and lock comparison. With this physical comparison for security purposes in place of a comparison of the ID codes through the communicating terminals 10 and 25, it still is possible to detect through charging terminal 11 that the battery 13 of the portable display means C has been charged, and for thereby conducting other communications by wireless or by infrared rays. Further, the insertion section 43 may extend laterally in the dashboard of the compartment for the portable display means C to extend laterally as shown in FIG. 8, or the insertion section 43 may be provided with a shallower depth so that a portion of the inserted portable display means C may be exposed from the insertion section 43.

What is claimed is:

1. A battery residual capacity display device and operating system for an electric vehicle for displaying residual capacity of a traveling battery mounted in the electric vehicle on a portable display separated from the vehicle, and having a residual capacity monitoring means in the vehicle for monitoring the residual capacity of said traveling battery said display device comprising:

a display area provided in said portable display for displaying a level of the residual capacity of said traveling battery from said residual capacity monitoring means, said operating system comprising:

an insertion section provided in the vehicle for insertion of the portable display;

a checking means for checking whether the portable display inserted into said insertion section is matched to the electric vehicle; and a travel permitting means for permitting traveling of the electric vehicle on the basis of an output from said checking means.

2. A battery residual capacity display device and operating system for an electric vehicle according to claim 1, wherein said portable display has a vehicle state displaying function comprising at least one of a function to signal an alarm if the vehicle is about to be stolen and a function to display a vehicle air-conditioned state.

3. A battery residual capacity display device and operating system for an electric vehicle according to claim 1, wherein said portable display includes a vehicle control function comprising at least one of a vehicle door locking/unlocking function and a vehicle air-conditioner operating/stopping function.

4. A battery residual capacity display device and operating system for an electric vehicle according to claim 1, wherein said travel permitting means is operated by the operation of a traveling switch following the insertion of said portable display.

5. A battery residual capacity display device and operating system for an electric vehicle according to claim 1, wherein said portable display includes a rechargeable battery for operating said portable display, cooperating means on said portable display and said insertion section for charging said rechargeable battery from the traveling battery when said portable display is inserted in said insertion section.

6. A battery residual capacity display device and operating system for an electric vehicle according to claim 1, wherein said travel permitting means includes a rotatable switch that, when said output permits said traveling, is rotatable in a clockwise direction from a locked position locking a steering wheel of an electric vehicle, to an off position unlocking the steering wheel, to an accessories position for allowing operation of at least one accessory in the electric vehicle, and then to an on position for said permitting traveling of the electric vehicle.

7. A display and operating system for an electric vehicle, comprising:

means in the electric vehicle for monitoring a residual capacity of a traveling battery mounted in the electric vehicle, a portable display separate from the electric vehicle, having a display area for displaying a level of the residual capacity of said traveling battery from said monitoring means, means in the electric vehicle and said portable display for wireless communication of signals between the electric vehicle and said portable display, an insertion section provided in the electric vehicle for insertion of said portable display;

a checking means for checking whether said portable display inserted into said insertion section is matched to electric vehicle; and a travel permitting means on the electric vehicle and operably connected to said checking means for permitting and precluding traveling of the electric vehicle on the basis of an affirmative and negative, respectively, output from said checking means.

8. A display and operating system for an electric vehicle according to claim 7, wherein said portable display has a vehicle state displaying function comprising at least one of a function to signal an alarm if the vehicle is subjected to an entry without using said portable display, and a function to display a vehicle air-conditioned state.

9. A display and operating system for an electric vehicle according to claim 7, wherein said portable display includes a vehicle control function comprising at least one of a vehicle door locking/unlocking function and a vehicle air-conditioner operating/stopping function.

10. A display and operating system for an electric vehicle according to claim 7, wherein said travel permitting means is operated by the operation of a traveling switch following the insertion of said portable display.

11. A display operating system for an electric vehicle according to claim 7, wherein said portable display includes a rechargeable battery for operating said portable display, cooperating means on said portable display and said insertion section for charging said rechargeable battery from the traveling battery when said portable display is inserted in said insertion section.

12. A display operating system for an electric vehicle according to claim 7, wherein said travel permitting means includes a rotatable switch that, when said output permits said traveling, is rotatable in a clockwise direction from a locked position locking a steering wheel of an electric vehicle, to an off position unlocking the steering wheel, to an accessories position for allowing operation of at least one accessory in the electric vehicle, and then to an on position for said permitting traveling of the electric vehicle.

13. A display operating system for an electric vehicle according to claim 7, wherein said checking means includes means for electrically connecting said portable display to the electric vehicle and means for matching an ID code of the electric vehicle and an ID code of the portable display.

* * * * *